US010016716B2

(12) United States Patent
Sundaram et al.

(10) Patent No.: US 10,016,716 B2
(45) Date of Patent: Jul. 10, 2018

(54) SWING ADSORBER AND PROCESS CYCLE FOR FLUID SEPARATIONS

(71) Applicant: ExxonMobil Research and Engineering Company, Annandale, NJ (US)

(72) Inventors: Narasimhan Sundaram, Annandale, NJ (US); Hans Thomann, Bedminster, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 77 days.

(21) Appl. No.: 15/258,097

(22) Filed: Sep. 7, 2016

(65) Prior Publication Data

US 2017/0087504 A1 Mar. 30, 2017

Related U.S. Application Data

(60) Provisional application No. 62/232,714, filed on Sep. 25, 2015.

(51) Int. Cl.
*B01D 53/047* (2006.01)
*B01D 53/04* (2006.01)
*B01J 20/34* (2006.01)

(52) U.S. Cl.
CPC ....... *B01D 53/0462* (2013.01); *B01D 53/047* (2013.01); *B01J 20/34* (2013.01); *B01J 20/3441* (2013.01); *B01D 2259/40011* (2013.01)

(58) Field of Classification Search
CPC ................ B01D 53/047; B01D 53/062; B01D 2259/40011; B01J 20/34; B01J 20/3441
USPC ...... 95/96–105, 107; 96/108, 109, 121, 150, 96/154
See application file for complete search history.

(56) References Cited

U.S. PATENT DOCUMENTS

| | | | | |
|---|---|---|---|---|
| 3,121,757 | A * | 2/1964 | Faust ..................... | B01D 15/34 208/310 R |
| 4,046,525 | A | 9/1977 | Matsuo et al. | |
| 5,593,480 | A * | 1/1997 | P oschl ............. | B01D 53/0446 96/124 |
| 7,094,275 | B2 | 8/2006 | Keefer et al. | |
| 7,836,941 | B2 | 11/2010 | Song et al. | |

(Continued)

FOREIGN PATENT DOCUMENTS

JP 01-231919 * 9/1989

OTHER PUBLICATIONS

PCT/US2016/050503 International Search Report and Written Opinion dated Dec. 19, 2016.

(Continued)

*Primary Examiner* — Frank Lawrence
(74) *Attorney, Agent, or Firm* — Andrew T. Ward

(57) ABSTRACT

Systems and methods are provided for performing a swing adsorption process, such as a temperature swing adsorption process. During portions of a swing cycle where one or more components are being desorbed, a vibration or other perturbation can be induced in the adsorbent and/or in the adsorbent structure to assist with desorption. Inducing a vibration or other perturbation in the adsorbent structure can provide a way to introduce additional energy into the adsorbent system without having to increase the temperature of the adsorbent structure.

33 Claims, 9 Drawing Sheets

501
503
505 509

(56) References Cited

U.S. PATENT DOCUMENTS

| | | | |
|---|---|---|---|
| 8,784,533 | B2 | 7/2014 | Leta et al. |
| 8,900,347 | B2 | 12/2014 | Boulet et al. |
| 9,034,078 | B2 | 5/2015 | Wannie et al. |
| 2006/0169142 | A1 | 8/2006 | Rode et al. |
| 2008/0282892 | A1 | 11/2008 | Deckman et al. |
| 2009/0018668 | A1 | 1/2009 | Galbraith |
| 2013/0137567 | A1* | 5/2013 | Stasko ................ B01J 20/3441 502/5 |

OTHER PUBLICATIONS

Yao, "Using power ultrasound for the regeneration of dehumidizers in desiccant air-conditioning systems: A review of prospective studies and unexplored issues", Renewable and Sustainable Energy Reviews, Sep. 2010, pp. 1860-1873, vol. 14, iss. 7, Elsevier, ScienceDirect.

* cited by examiner

Change in Swing Variable during Swing Cycle

SWING ADSORBER AND PROCESS CYCLE FOR FLUID SEPARATIONS

CROSS REFERENCE TO RELATED APPLICATIONS

This application claims priority to U.S. Provisional Application Ser. No. 62/232,714 filed on Sep. 25, 2015, herein incorporated by reference in its entirety.

FIELD

Systems and methods are provided for improving the working capacity of adsorbents during swing adsorption processes.

BACKGROUND

Gas separation is important in many industries and can typically be accomplished by flowing a mixture of gases over an adsorbent that preferentially adsorbs a more readily adsorbed component relative to a less readily adsorbed component of the mixture. One of the more important types of gas separation technology is swing adsorption, such as pressure swing adsorption (PSA). PSA processes rely on the fact that under pressure gases tend to be adsorbed within the pore structure of the microporous adsorbent materials or within the free volume of a polymeric material. The higher the pressure, the greater the amount of targeted gas component will be adsorbed. When the pressure is reduced, the adsorbed targeted component is released, or desorbed. PSA processes can be used to separate gases of a gas mixture because different gases tend to fill the micropore or free volume of the adsorbent to different extents.

Another important gas separation technique is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Conventional swing adsorption vessels can contain a plurality of individual monolith adsorbent contactors within a cylindrical vessel. The monolith contactors can have multiple substantially parallel gas flow channels running along the longitudinal axis of the contactor, with an adsorbent material lining the walls of the open channels. Various engineering problems limit the flow through capacity of such adsorption vessels. These problems may be further complicated by the swing adsorption process. For example, TSA processes have to overcome substantial challenges in designing equipment to achieve these process needs. Some of the challenges include: (a) rapid cycling of pressure; (b) rapid cycling of temperatures; (c) high area density requirements; and/or (d) forming sufficient microchannels with sufficient adsorbent material. Accordingly, there remains a need in the art for monolith designs that mitigate at least the above-mentioned problems, especially those associated with undesirable gaseous steam paths between contactors.

U.S. Pat. No. 8,900,347 describes a temperature swing adsorption apparatus. The apparatus includes axial thermally conductive filaments that can assist with heating and/or cooling of the adsorbent.

U.S. Pat. No. 8,784,533 describes a temperature and/or pressure swing adsorption process using a solid adsorbent, such as an adsorbent provided as a parallel channel contactor. The temperature of the solid adsorbent can be controlled by introducing a heating and/or cooling fluid through heating and/or cooling channels in the adsorbent that are not in fluid communication with the channels that provide the feed gas for separation. This can allow physical contact between the heating and/or cooling fluid without exposing the gas being separated to the fluid.

U.S. Pat. No. 9,034,078 describes a parallel plate contactor for adsorption processes. The parallel plate contactor can include separate passages for a utility fluid and for a gas containing a gas component for adsorption.

SUMMARY OF THE INVENTION

In one aspect, a method for performing a swing adsorption process is provided, the method comprising: exposing an input fluid comprising a first gas component to an adsorbent structure comprising an adsorbent at a first temperature and a first pressure to adsorb at least a portion of the first gas component; desorbing at least a portion of the adsorbed first gas component under desorption conditions, the desorption conditions comprising at least one of a desorption temperature higher than the first temperature and a desorption pressure lower than the first pressure; and inducing, after the exposing, one or more perturbations in the adsorbent, the adsorbent structure, or a combination thereof, the one or more perturbation being induced prior to a subsequent exposing of input fluid to the adsorbent structure. Optionally, the adsorbent can be further exposed to a utility fluid, such as during the exposing of the input fluid to the adsorbent, during the desorbing, or a combination thereof In another aspect, a system for inducing perturbations in an adsorbent structure, comprising: an adsorbent structure comprising an adsorbent; a perturbation source for inducing a perturbation in the adsorbent, at least a portion of the adsorbent structure, or a combination thereof, the perturbation source comprising at least one of an actuator, an electromagnetic radiation source, an acoustic source, a thermoacoustic source, a magnet, and an electromagnet; and a controller for activating the perturbation source.

DETAILED DESCRIPTION OF THE EMBODIMENTS

Overview

Figure 1:
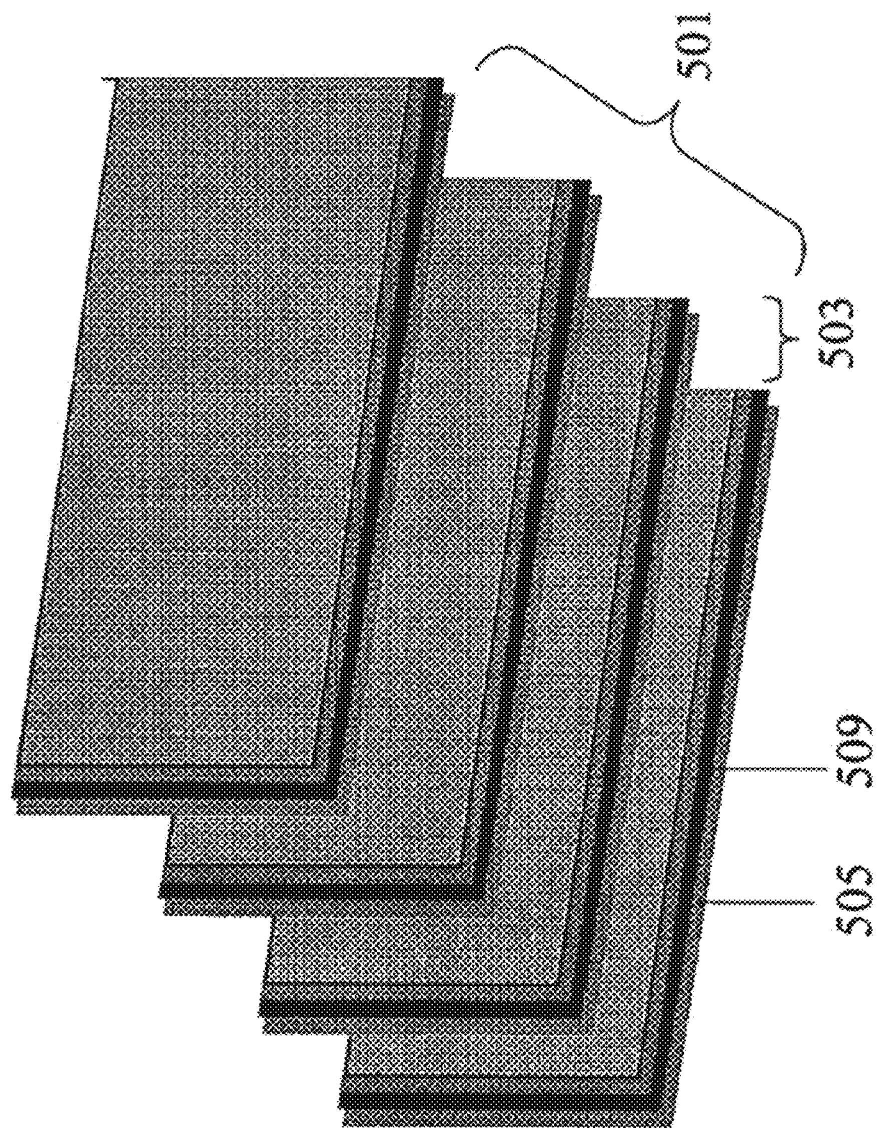
FIG. 1 schematically shows an example of an adsorbent structure.

In various aspects, systems and methods are provided for performing a swing adsorption process, such as a temperature swing adsorption process. During portions of a swing cycle where one or more components are being desorbed, a vibration or other perturbation can be induced in the adsorbent and/or in the adsorbent structure to assist with desorption. Optionally, the adsorbent structure can correspond to a structure suitable for transmitting vibrations to the adsorbent, such as a contactor composed as a plurality of plates coated with the adsorbent. Optionally, the adsorbent structure can include a waveguide, magnetic material, or another structure to assist with delivery of an electromagnetic or magnetic perturbation. Inducing a vibration or other perturbation in the adsorbent structure can provide a way to introduce additional energy into the adsorbent system without having to increase the temperature of the adsorbent structure. It is believed that vibrational and/or electromagnetic perturbations can be suitable for delivering additional energy to adsorbent sites of an adsorbent to assist with desorption. It is also believed that vibrational and/or electromagnetic perturbations can be suitable for delivering additional energy to fluids residing within pores of the adsorbent to assist with removal of such liquids.

Swing Adsorption Processes

Swing adsorption processes can have an adsorption step in which a feed mixture (typically in the gas phase) is flowed over an adsorbent that can preferentially adsorb a more readily adsorbed component relative to a less readily adsorbed component. A component may be more readily adsorbed because of kinetic or equilibrium properties of the adsorbent. The adsorbent is typically contained in a contactor that is part of the swing adsorption unit. In some aspects, a plurality of contactors can be used as part of a swing adsorption system. This can allow adsorption and desorption to be performed as a continuous process, with one or more contactors being used for adsorption while one or more additional contactors are used for desorption. As contactors approach a desired and/or maximum loading during adsorption and/or approach a desired and/or complete desorption under the desorption conditions, the flows to the contactors can be switched between adsorption and desorption. It is noted that after the desorption step, the adsorbent may retain a substantial loading of the gas component. In various aspects, the loading of the adsorbent with the adsorbed gas component at the end of the desorption step can be at least about 0.01 mol/kg, or at least about 0.1 mol/kg, or at least about 0.2 mol/kg, or at least about 0.5 mol/kg, or at least about 1.0 mol/kg, and/or about 3.0 mol/kg or less, or about 2.5 mol/kg or less, or about 2.0 mol/kg or less, or about 1.5 mol/kg or less. Additionally or alternately, the loading at the end of the desorption step can be characterized relative to the loading at the end of the prior adsorption step. The adsorbent loading at the end of the desorption step can be at least about 0.01% of the adsorbent loading at the end of the prior adsorption step, or at least about 0.1%, or at least about 1%, or at least about 5%, or at least about 10%, or at least about 20%, or at least about 30%, or at least about 50%, and/or about 70% or less, or about 60% or less, or about 50% or less, or about 40% or less, or about 30% or less, or about 20% or less, or about 10% or less, or about 5% or less, or about 1% or less.

The method of adsorbent regeneration designates the type of swing adsorption process. Pressure swing adsorption (PSA) processes rely on the fact that gases under pressure tend to be adsorbed within the pore structure of the microporous adsorbent materials. The higher the pressure, the greater the amount of targeted gas component that will be adsorbed. When the pressure is reduced, the adsorbed targeted component is released, or desorbed. PSA processes can be used to separate gases of a gas mixture because different gases tend to fill the micropore or free volume of the adsorbent to different extents due to either the equilibrium or kinetic properties of the adsorbent. Temperature swing adsorption (TSA) processes also rely on the fact that gases under pressure tend to be adsorbed within the pore structure of the microporous adsorbent materials. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Temperature swing adsorption (TSA) processes, also referred to as thermal swing adsorption processes, can employ an adsorbent that is repeatedly cycled through at least two steps—an adsorption step and a thermally assisted regeneration step. Regeneration of the adsorbent can be achieved by heating the adsorbent to an effective temperature to desorb target components from the adsorbent. The adsorbent can then be cooled so that another adsorption step can be completed. The thermal swing adsorption process can be conducted with rapid cycles, in which case they are referred to as rapid cycle temperature swing adsorption (RCTSA). A rapid cycle thermal swing adsorption process is defined as one in which the cycle time between successive adsorption steps is less than about 10 minutes, preferably less than about 2 minutes, for example less than about 1 minute. RC-TSA processes can be used to obtain very high product recoveries in the excess of 90 vol %, for example greater than 95 vol % or, in some cases, greater than 98 vol %. The term "adsorption" as used herein includes physisorption, chemisorption, and condensation onto a solid support, absorption into a solid supported liquid, chemisorption into a solid supported liquid, and combinations thereof.

It is noted that a TSA cycle can also typically include a change in the temperature of the adsorbent from the temperature for the adsorption step to the temperature for the desorption step. The adsorption step can be defined based on the time when the gas flow is started for the input gas containing the component for adsorption and when the gas flow is stopped. The desorption step can be defined based on the time when gas being desorbed from the adsorbent is collected to the time collection is stopped. Any time in the cycle outside of those steps can be used for additional adjustment of the adsorbent temperature.

A potential advantage of a TSA separation can be that the process can be performed at a convenient pressure, or with a small amount of variation around a convenient pressure. For example, a goal of a TSA separation can be to develop a substantially pure stream of a gas component that is adsorbed and then desorbed. In this type of aspect, a convenient pressure for the desorption step can be a temperature of about 1 bar (0.1 MPa) or less. Attempting to desorb a stream at greater than about 0.1 MPa can require substantial additional temperature increase for desorption. Additionally, ambient pressure can be a convenient pressure for the adsorption step as well, as many streams containing a gas component for adsorption can correspond to "waste" or flue gas streams that may be at low pressure. In some aspects, the pressure difference between the adsorption and desorption steps can be about 1 MPa or less, or about 0.2 MPa or less, or about 0.1 MPa or less, or about 0.05 MPa or less, or about 0.01 MPa or less. In some optional aspects, it can be desirable to assist desorption of a stream using a displacing fluid. In such aspects, the pressure of the desorbed component can be a fraction of the total pressure.

A variety of types of solid adsorbents are available for separation of components from a gas flow using temperature swing adsorption (TSA). During a conventional TSA process, at least one component in a gas flow can be preferentially adsorbed by the solid adsorbent, resulting in a stream with a reduced concentration of the adsorbed component. The adsorbed component can then be desorbed and/or displaced from the solid adsorbent, optionally to form a stream having an increased concentration of the adsorbed component.

One of the ongoing challenges with swing adsorption processes is balancing between the desire to increase the working capacity of the adsorbent and the desire to reduce the cycle time. For an idealized process, the working capacity of an adsorbent can be increased by increasing the severity of the difference between the conditions during adsorption and desorption of a target component that is adsorbed out of a gas flow. This can correspond to increasing the difference in pressure between adsorption and desorption (typically for PSA), increasing the difference in temperature between adsorption and desorption (typically for TSA), or a combination thereof.

In practical application, the amount of pressure and/or temperature difference between adsorption and desorption can be limited by a desire to improve total cycle time. Increasing the differential in pressure and/or temperature between adsorption and desorption can cause a corresponding increase in the time required for transitioning between the adsorption and desorption portions of a cycle. This can include one or both of the transition from adsorption to desorption or the transition from desorption to adsorption.

A further complication in swing adsorption processes can be related to achieving full working capacity and/or achieving full restoration of the adsorbent monolith to a desired state prior to the next adsorption step. Equilibrium adsorption isotherms can describe the potential working capacity that may be achieved during a full swing adsorption cycle. However, achieving a desired desorption condition does not guarantee that equilibrium is reached at that condition. For example, in temperature swing adsorption, it can be desirable to reduce or minimize the desorption temperature so long as the temperature still achieves a desired amount of desorption. This can often correspond to a temperature of less than about 200° C. At such temperatures, desorption to equilibrium values may take a long time relative to a cycle time, as random fluctuations within the temperature ensemble state may be needed to achieve desorption of individual adsorbed compounds.

The problem with incomplete desorption can be further exacerbated if other fluids are present in the desorption environment. For example, one potential option for increasing the rate of temperature change during a swing adsorption process could be to use a liquid phase fluid to provide better thermal contact and/or heat capacity. However, such a fluid can potentially become trapped in the porous structures found in many adsorbents. Simply increasing the temperature of the adsorbent monolith to the desorption temperature may be insufficient to dislodge such fluids that are within the pores of the adsorbent.

In various aspects, the above difficulties with balancing the driving force for desorption with the desire for shorter cycle times can be reduced, mitigated, or minimized by introducing one or more perturbations, such as vibrational perturbations, during the desorption step. Inducing a perturbation in the adsorbent structure can provide a way to introduce additional energy into the adsorbent system without having to increase the temperature of the adsorbent structure. It is believed that vibrational and/or electromagnetic perturbations can be suitable for delivering additional energy to adsorbent sites of an adsorbent to assist with desorption. It is also believed that vibrational and/or electromagnetic perturbations can be suitable for delivering additional energy to fluids residing within pores of the adsorbent to assist with removal of such liquids.

In some aspects, by providing an additional vibration (or other perturbation) to assist with desorption, the ability to use a utility fluid and/or heat transfer fluid can be enhanced. A utility fluid and/or heat transfer fluid can be used to assist with adjusting the temperature (heating and/or cooling) of an adsorbent structure. Additionally or alternately, for a utility fluid and/or heat transfer fluid that contacts the adsorbent, the utility fluid and/or heat transfer fluid can potentially also assist with desorption of an adsorbed component, such as by displacement of an adsorbed component. The enhancement can include an ability to use utility fluids that would normally be considered unsuitable for use with a porous adsorbent due to difficulties in desorbing the fluid from the pores of the porous adsorbent. For example, water is potentially a suitable utility fluid, but water can be difficult to fully desorb from a porous adsorbent in an adsorbent structure. Use of perturbations during a desorption step and/or prior to beginning an adsorption step can facilitate additional removal of water from pores, which may allow for use of water as a utility fluid.

As another example, some adsorbed compounds are susceptible to undergoing condensation and/or oligomerization type reactions while adsorbed. An example is the formation of "green" oils during removal of HCl from hydrocarbons using alumina sorbents. Use of perturbations during desorption can help to reduce or minimize formation of such undesired condensation and/or oligomerization products by assisting with faster desorption of adsorbed components.

Without being bound by any particular theory, it is believed that the nature of the adsorbent structure can influence the improvement achieved when inducing a perturbation in the adsorbent. Some adsorbent contactors can correspond to extruded adsorbent monoliths with axial channels for allowing gas to more readily access the interior of the monolith. Other adsorbent contactors can correspond to plates or modules, with adsorbent coated on the surface(s) of the plates or modules. Still other adsorbent contactors can correspond to flexible plates, sheets, or even cloth-like structures. These differences in structure can alter the method for inducing a perturbation. For example, a structure composed of plates or modules can potentially have separate induced perturbations for different plates or modules, while an extruded monolith can generally receive only a single excitation at a given time. Additionally or alternately, the plate or module structure may be more receptive to transmission of a vibration or other perturbation within the contactor structure. A more flexible structure can potentially allow for introduction of larger amplitude vibrations into the adsorbent structure.

Perturbations of Adsorbent Structures

In various aspects, one or more perturbations may be induced in an adsorbent structure during desorption of gas (or other fluids) from the adsorbent. The perturbation can correspond to a mechanical vibration, an electromagnetic perturbation, a magnetic perturbation, an electromechanical vibration, an acoustic vibration, or a combination thereof.

For adsorbent structures that comprise an adsorbent layer coated on another structure, the perturbation can be effective for transferring energy from the adsorbent structure into the adsorbent layer.

A perturbation can be induced in the adsorbent structure at any convenient time during a swing adsorption cycle. Optionally, the perturbation could be induced in the adsorbent structure during the entire cycle, although the benefit of inducing a vibration during the adsorption portion of the cycle may be less clear. The perturbation can be continuously induced in the adsorbent structure, or the perturbation can be induced for one or more portions of the swing cycle, such as one or more time periods during a desorption step of a swing cycle. Optionally, different types of perturbations can be induced at different time periods during an adsorption swing cycle and/or different types of perturbations can be induced for overlapping time periods during an adsorption swing cycle.

The characteristics of a perturbation induced in the adsorbent structure can vary during the perturbation. For example, the amplitude of a perturbation can be changed during the perturbation. Additionally or alternately, the frequency of the perturbation can vary in any convenient manner during the perturbation, such as by increasing and/or decreasing a vibrational frequency (including an acoustic frequency) and/or by increasing or decreasing an electromagnetic frequency. In some aspects, modifying the perturbation can include modifying the perturbation to have a frequency that corresponds to a resonant frequency of the adsorbent structure, a resonant frequency of a portion of the adsorbent structure, and/or a resonant frequency of the adsorbent. In other aspects, modifying the perturbation can include modifying the perturbation without matching a resonant frequency of the adsorbent structure, a resonant frequency of a portion of the adsorbent structure, and/or a resonant frequency of the adsorbent. In yet other aspects, a frequency of the perturbation can remain the same during a perturbation, with the frequency being different from a resonant frequency of the adsorbent structure, a resonant frequency of a portion of the adsorbent structure, and/or a resonant frequency of the adsorbent.

In aspects, where more than one perturbation is induced in an adsorbent structure, the conditions for each perturbation can be selected to be the same for each perturbation, or the conditions can be selected each independently for each perturbation. The conditions for a perturbation can include, but are not limited to, a frequency of the perturbation, an amplitude for the perturbation, a length of time for the perturbation, or a combination thereof. When referring to a frequency or an amplitude for a perturbation other than a resonant frequency, the frequency and amplitude are defined as the frequency and/or amplitude provided by the source of the perturbation. For a perturbation corresponding to a resonant frequency, the resonant frequency can be based on either the frequency of the source of the perturbation or the resulting induced frequency in the adsorbent structure, portion of the adsorbent structure, and/or the adsorbent.

For perturbations that overlap in time, any convenient overlap can be selected. The overlap between two (or more) perturbations can correspond to a complete overlap, where both perturbations start and end at the same time; an overlap where the time period for one perturbation is contained within a time period for a second perturbation; and/or a partial overlap, where 90% or less of the perturbation times overlap, or 75% or less, or 50% or less, or 25% or less, or 10% or less. For overlap in time periods corresponding to a partial overlap, the percentage of time overlap is defined based on the percentage of overlap for the shortest time period of the overlapping time periods.

An example of a perturbation that can be induced in an adsorbent structure is a mechanical vibration. A mechanical vibration can be induced by using one or more actuators in contact with the adsorbent structure. An example of a suitable dynamic actuator and system for inducing a vibration in an adsorbent structure can be found in U.S. Pat. No. 7,836,941, the entirety of which is incorporated herein by reference.

Figure 7:
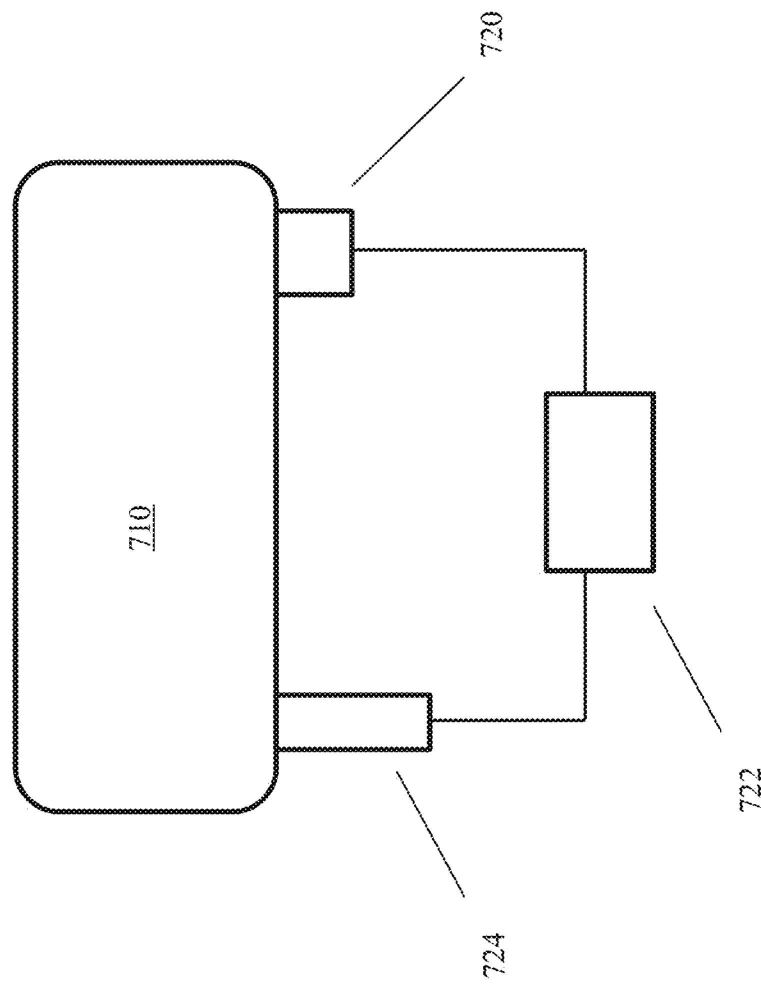
FIG. 7 schematically shows an example of a system for inducing perturbations in an adsorbent structure.

FIG. 7 schematically shows an example of a dynamic actuator 720 added to an adsorbent structure 710, such as a parallel plate adsorbent structure. The dynamic actuator 720 can be positioned and/or mounted at any convenient location on the adsorbent structure, such as at an edge of the structure. Optionally, a plurality of actuators can be used to induce perturbations in different plates of a parallel plate adsorbent structure. The actuator 720 can impart controlled vibrational energy to the adsorbent structure 710. A controller 722 is preferably in communication with the dynamic actuator 20 to control the forces applied to the adsorbent structure 710. A sensor 724 coupled to the adsorbent structure 710 can be provided in communication with the controller 722 to provide feedback for measuring vibration and providing data to the controller 722 to adjust the frequency and amplitude output of the dynamic actuator 720.

The controller 722 can be any known type of processor, including an electrical microprocessor, disposed at the location or remotely, to generate a signal to drive the dynamic actuator 720 with any necessary amplification. The controller 722 can include a signal generator, signal filters and amplifiers, and digital signal processing units.

The dynamic actuator 720 can take the form of any type of mechanical device that induces vibration while maintaining structural integrity of the adsorbent structure 710. Any device capable of generating sufficient dynamic force at selected frequencies would be suitable. The dynamic actuator 720 can be single device, such as an impact hammer or electromagnetic shaker, or an array of devices, such as hammers, shakers or piezoelectric stacks. An array can be spatially distributed to generate the desired dynamic signal to achieve an optimal vibrational frequency.

The dynamic actuator 720 may be placed at various locations on or near the adsorbent structure 710 as long as there is a mechanical link to the adsorbent structure and/or the adsorbent. Vibrations can be transferred through various structures in the system so the actuator does not need to be directly connected to the adsorbent structure 720.

Other examples of perturbations can correspond to magnetic or electromagnetic perturbations. Magnetic perturbations can be introduced into an adsorbent, for example, by providing electromagnetic structures within the adsorbent structure and providing current to the electromagnetic structures to induce a desired perturbation. An example of inducing an electromagnetic perturbation can be to use microwave radiation along an adsorbent surface. Such an electromagnetic perturbation can be provided without causing a substantial temperature increase in the adsorbent structure. The perturbation-induced temperature increase due to an electromagnetic perturbation can be 10° C. or less, or 5° C. or less, thus distinguishing such a perturbation from resistive heating of an adsorbent structure. A perturbation-induced temperature increase is defined herein as the temperature increase of an adsorbent structure when the adsorbent structure is exposed to the perturbation at 25° C. and 1 bar (101 kPa), with an atmosphere containing only gas components that are adsorbed in an amount of less than 0.1 mol/kg. Optionally, a waveguide structure associated with an adsorbent structure can be used to facilitate transmission of the electromagnetic perturbation into the adsorbent of the adsorbent structure.

Yet another example of a perturbation can be a thermoacoustic perturbation. Still other examples of suitable structures for inducing a perturbation (such as a vibration) in an adsorbent structure will be apparent to those of skill in the art.

Examples of Adsorbent Structures

In various aspects, an adsorbent structure can correspond to a contactor for use in a swing adsorption vessel. More generally, in this discussion an adsorbent structure can correspond to any type of structure, either rigid or non-rigid, that includes or incorporates an adsorbent suitable for adsorption of a gas component during a swing adsorption process. This can include conventional contactor adsorbent structures, such as parallel plate contactors, adsorbent monoliths, and other conventional structures. This can also include non-rigid structures, such as flexible, curtain-like, and/or fabric-like adsorbents that may be able to exhibit larger amplitude fluctuations in position in response to an induced vibration. Still other adsorbent structures can correspond to beds of adsorbent particles, either in a conventional adsorbent bed configuration or in a non-traditional configuration, such as use of bed of adsorbent particles under trickle flow conditions.

A variety of contactors corresponding to adsorbent structures are known, such as the contactors (adsorbent structures) described in U.S. Patent Application Publication 2008/0282892, the entirety of which is incorporated herein by reference. For example, FIG. 1 hereof is a representation of a parallel channel contactor of the present invention in which the parallel channels are formed from laminated sheets containing adsorbent material. Laminates, laminates of sheets, or laminates of corrugated sheets can be used in pressure and/or temperature swing adsorption processes. Laminates of sheets are known in the art and are disclosed in U.S. patent applications US20060169142 A1 and U.S. Pat. No. 7,094,275 B2. When the adsorbent is coated onto a geometric structure or components of a geometric structure that are laminated together, the adsorbent can be applied using any suitable liquid phase coating techniques. Non-limiting examples of liquid phase coating techniques that can be used in the practice of the present invention include slurry coating, dip coating, slip coating, spin coating, hydrothermal film formation and hydrothermal growth. When the geometric structure is formed from a laminate, the laminate can be formed from any material to which the adsorbent of the present invention can be coated. The coating can be done before or after the material is laminated. In all these cases the adsorbent is coated onto a material that is used for the geometric shape of the contactor. Non-limiting examples of such materials include glass fibers, milled glass fiber, glass fiber cloth, fiber glass, fiber glass scrim, ceramic fibers, metallic woven wire mesh, expanded metal, embossed metal, surface-treated materials, including surface-treated metals, metal foil, metal mesh, carbon-fiber, cellulosic materials, polymeric materials, hollow fibers, metal foils, heat exchange surfaces, and combinations of these materials. Coated supports typically have two major opposing surfaces, and one or both of these surfaces can be coated with the adsorbent material. When the coated support is comprised of hollow fibers, the coating extends around the circumference of the fiber. Further support sheets may be individual, presized sheets, or they may be made of a continuous sheet of material. The thickness of the substrate, plus applied adsorbent or other materials (such as desiccant, catalyst, etc.), typically ranges from about 10 micrometers to about 2000 micrometers, more typically from about 150 micrometers to about 300 micrometers.

Metallic mesh supports can provide desirable thermal properties of high heat capacity and conductivity which "isothermalize" a PSA, RCPSA, PPSA or RCPPSA cycle to reduce temperature variations that degrade the process when conducted under more adiabatic conditions. Also, metal foils are manufactured with highly accurate thickness dimensional control. The metal foil may be composed of, without limitation, aluminum, steel, nickel, stainless steel or alloys thereof. The metal foil can then be coated with a thin adsorbent layer of accurately controlled thickness.

FIG. 1 hereof illustrates an exploded view of an embodiment of the present invention wherein a microporous adsorbent film 505 is grown or deposited (such as hydrothermally grown) on each of both faces of flat metal foils 509, which can be fabricated from a corrosion resistant metal such as stainless steel. The separate metal foils 509 with the adsorbent films 505 are fabricated to form a parallel channel contactor 501. Spacers of appropriate size may placed between the metal foils during contactor fabrication so that the channel gap 503 is of a predetermined size. Preferably about half of the volume of the feed channels 503 are filled with a spacer that keeps the sheets substantially evenly spaced apart.

U.S. Pat. No. 9,034,078, the entirety of which is incorporated herein by reference, provides another example of a contactor (adsorbent structure) that is suitable for use with introduction of perturbations in order to improve desorption. In this type of example, a plurality of plates and/or modules can be stacked together to form a monolith structure. The structure can include channels for gas flow (for adsorption and/or desorption of gas) and optionally separate channels for flow of a utility fluid. Additionally or alternately, a utility fluid can be flowed through the same channels as the gas flow.

Figure 3A:
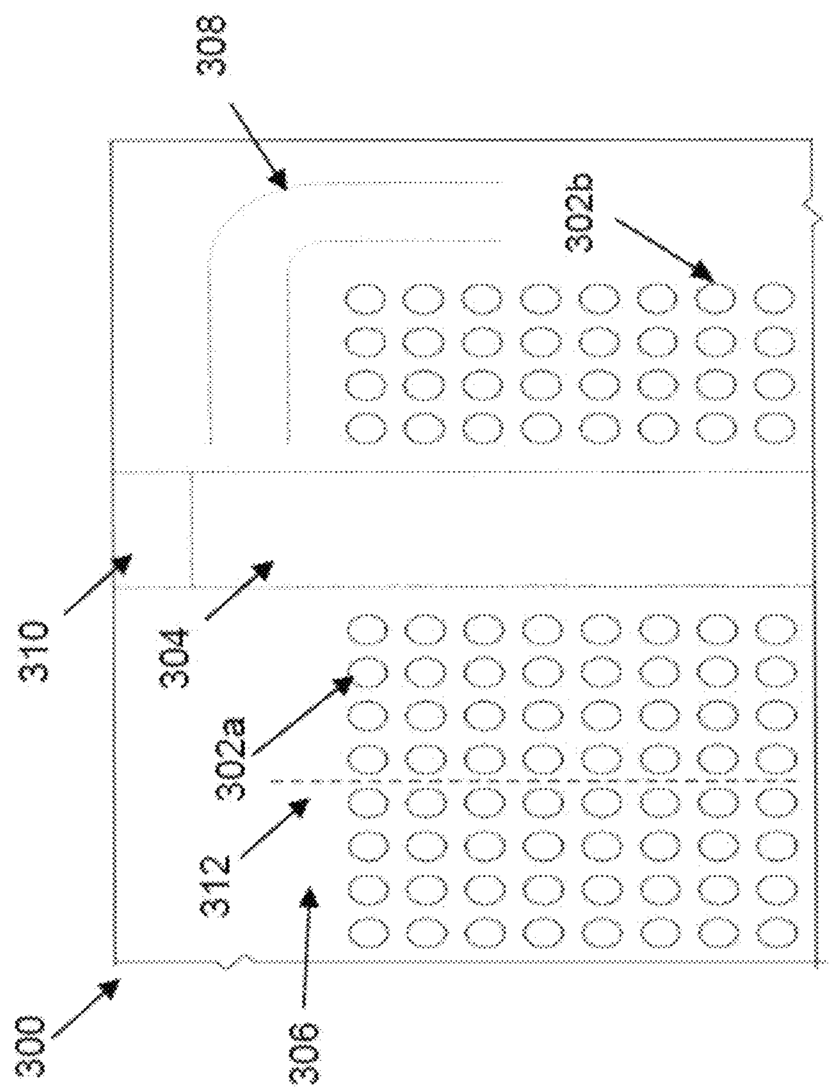
FIGS. 3A and 3B schematically show examples of an adsorbent structure.

To manage the flow of fluids through a monolith adsorbent contactor, channels may be provided by forming holes and/or voids within different layers and/or modules of the adsorbent contactor. As an example, FIG. 3A hereof is a partial top view of a section 300 of a bundle of stacked adsorbent contactors. The adsorbent contactor may be formed by one or more plates and/or one or more modules (e.g., two or more combined plates). The plates may have a thickness in a range from 0.3 mm to 50 mm, in a range from 0.38 mm to 50 mm, or in a range from 0.3 mm to 1 mm. In this view, one or more gaseous holes or openings 302*a* and 302*b* (which may be referred to as gaseous openings 302) and a utility fluid opening 304 are formed to provide fluid passages through the top plate 306 of the absorbent contactor. Additionally or alternately, a utility fluid (gas or liquid) can also be passed through gaseous openings 302. These one or more gaseous opening 302 and utility fluid opening 304 may be formed in each of the plates and/or modules of the absorbent contactor to form the respective channels for the different streams flowing through the absorbent contactor. The plates may be bonded together in a convenient manner, such as by diffusion bonding. Another mechanism that may be utilized to manage the flow of fluid may be a gasket. A portion of the gasket 308 that is utilized to manage fluid flow away from the channels. The gasket may be disposed adjacent to the top plate 306 of the absorbent contactor near an edge area 310 of the absorbent contactor. In particular, the gasket may be disposed between a housing (not shown) and the adsorbent contactor to provide additional flow control utilized to hinder flow from the non-preferred flow paths.

In the top plate 306 of the adsorbent contactor, the one or more gaseous holes 302 and utility fluid hole 304 may be formed into a specific pattern or configuration. The one or more gaseous holes 302 may have diameter in the range 0.2 mm to 5 mm or in the range 0.3 mm to 1 mm or in the range 0.3 mm to 2 mm. As a specific example of the configuration, the different gaseous openings 302 may be formed in the top plate in a parallel configuration. In this configuration, eight rows of openings 302*a* (which are divided by a line of symmetry 312) are located in an interior region of the top plate 306, while four rows of openings 302*b* are disposed adjacent to an edge region. These openings 302*a* and 302*b* are separated by the utility fluid opening 304. In this configuration, the utility fluid opening 304 may be utilized to heat and/or cool the four rows of openings 302*a* and 302*b* adjacent to the utility fluid opening 304. The number of rows of openings that is associated with the utility fluid opening may be subject to an optimization calculation based on heat conduction time in the solid, which is dependent on the opening diameter. The diameter of the openings 302*a* and 302*b* and the pitch of the openings 302*a* and 302*b* may, preferably, be less than a millimeter, while the width of the utility fluid opening 304 may be less than or equal to 2 millimeters (mm). The dimensions of the openings 302*a* and 302*b* provide a high surface area for the gaseous stream (e.g., 1000 $m^2/m^3$ to 4000 $m^2/m^3$). In this manner, the area density may be maximized to increase the effectiveness of the exchanger (e.g., a reduced "thermal mass"), while also minimizing the overall cost.

Figure 3B:
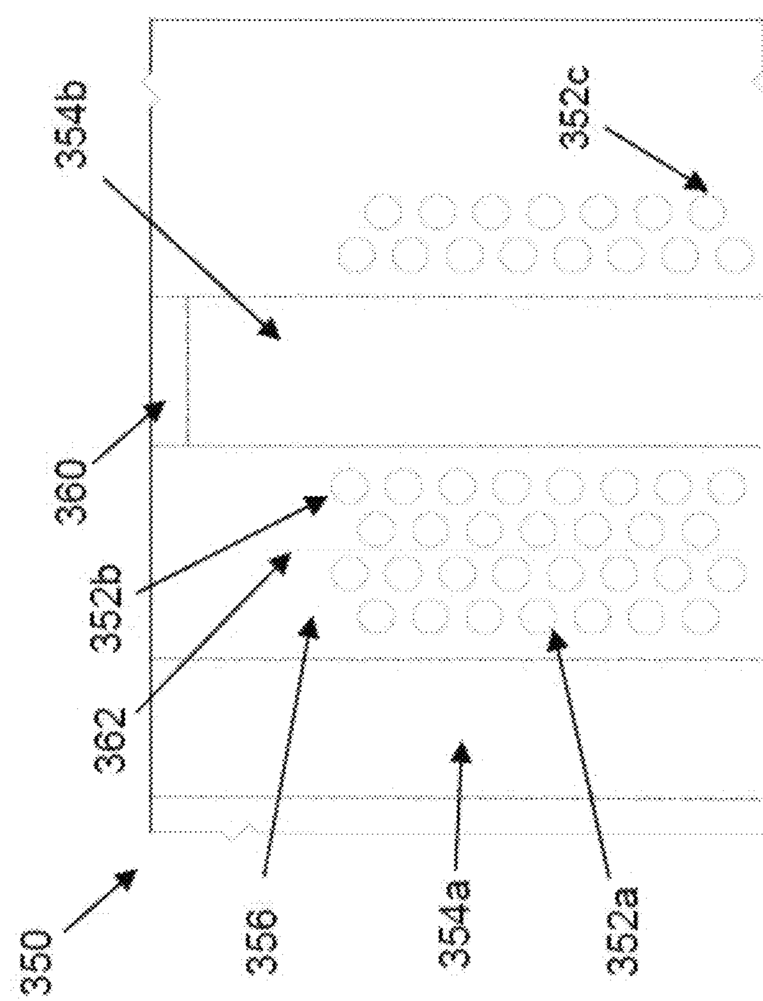

To further enhance the flow of the gaseous steam, different gaseous opening configurations may be utilized for the gaseous channels in the plates or modules. As an example, FIG. 3B is a partial top view of a section 350 of the bundle of stacked adsorbent contactors in accordance with another exemplary embodiment of the present techniques. In this view, one or more gaseous holes or openings 352*a*, 352*b* and 352*c* (which may be referred to as gaseous openings 352) and a utility fluid opening 354*a* and 354*b* (which may be referred to as utility fluid openings 354) are formed to provide fluid passages through the top plate 356 of the absorbent contactor. Similar to the discussion of FIG. 3A, these one or more gaseous opening 352 and utility fluid opening 354 may be formed in each of the plates and/or modules of the absorbent contactor to form the respective channels for the different streams flowing through the absorbent contactor. Further, the top plate 356 may also include gasket (not shown) and an edge region 360, which are similar to those described in FIG. 3A.

In the top plate 356 of the adsorbent contactor, the one or more gaseous holes 352 and utility fluid hole 354 may be formed into a specific pattern or configuration. As a specific example in this embodiment, the different gaseous openings 352 may be formed in the top plate. 356 in an alternate triangular arrangement or configuration. In this configuration, two rows of openings 352*b* (which are separated from the gaseous openings 352*a* by a line of symmetry 362) are located in an interior region of the top plate 356, while two rows of gaseous openings 352*c* are disposed adjacent to an edge region. The utility fluid opening 354*b* is disposed between these openings 352*b* and 352*c*. In this configuration, the utility fluid opening 354*b* may be utilized to heat and/or cool the four rows of openings 352*b* and 352*c* adjacent to the utility fluid opening 354*b*. The number of rows of openings that is associated with the utility fluid opening may be subject to an optimization calculation based on heat conduction time in the solid, which is dependent on the opening diameter. The utility fluid opening 354*a* may be utilized to heat and/or cool the four rows of openings 352*a* and another not shown adjacent to the utility fluid opening 354*a*.

Beneficially, this configuration provides the openings for the gas flow are in the same direction as the imposed pressure force used in the bonding (such as diffusion bonding) process. This allows the openings to be spaced very close together and reduces the time for heat transfer, which is sensitive in the rapid-cycle process operation. As noted above, conventional diffusion bonded heat exchangers have both sets of channels perpendicular to the pressure force during diffusion bonding, which results in a larger metal thickness being required to withstand those pressures. In this configuration, the distance between any two pairs of openings does not factor into the pressure-integrity concern, but the distance from the edge of the first row of gaseous openings to the edge of the utility fluid opening is a factor; as this region involves diffusion-bonding with high reliability.

Figure 4A:
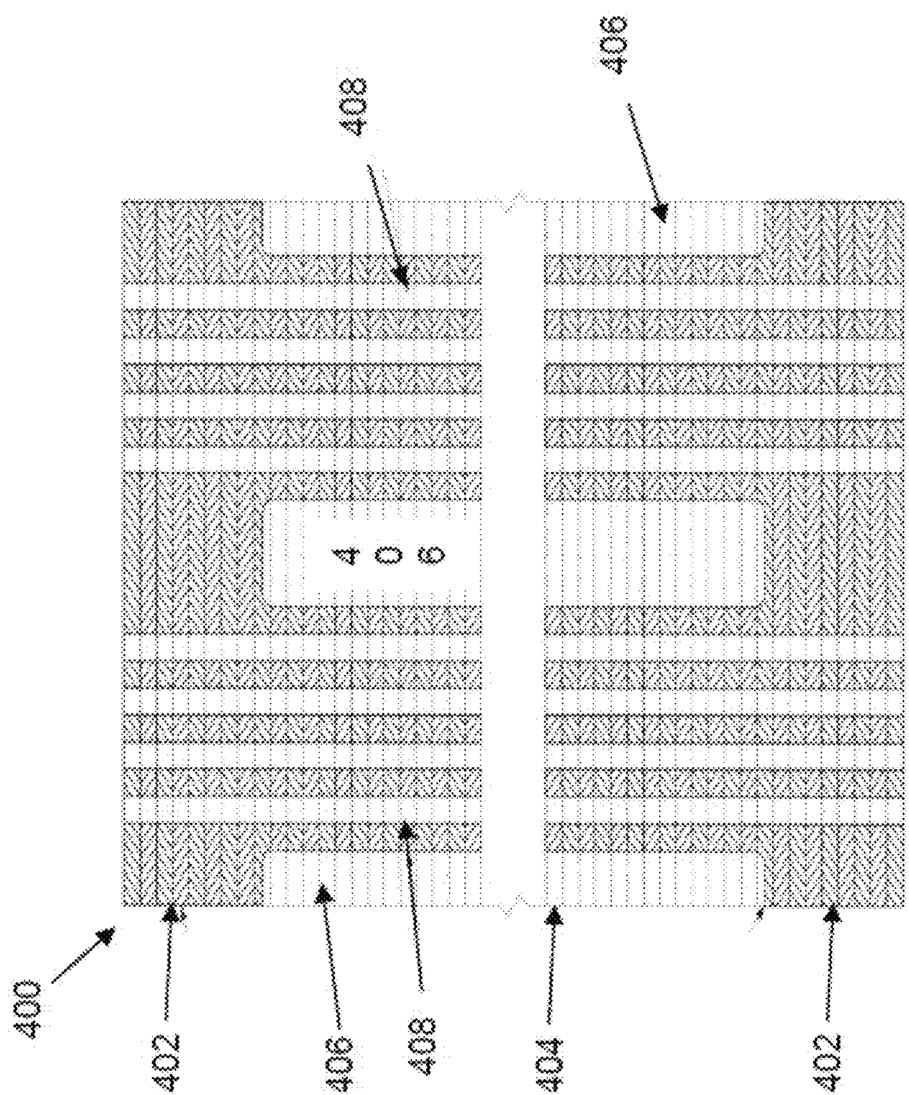
FIGS. 4A and 4B schematically show examples of an adsorbent structure.

To view the channels formed by these various openings, the adsorbent contactor may be formed by one or more plates and/or one or more modules (e.g., two or more combined plates) that are stacked together. As an example, FIG. 4A hereof is a partial cross sectional view of a section 400 of a bundle of stacked adsorbent contactor in accordance with an exemplary embodiment of the present techniques. As shown in this figure, two types of thin plates may be utilized, which are (i) plates 402 without utility fluid openings and (ii) plates 404 with utility fluid openings 406. Each of the plates 402 and 404 include gaseous openings 408 to provide a fluid passage through the stacked adsorbent contactor. For the first type of plates 402, no material is removed for the utility fluid openings 406, while the second type of plate 404 has utility fluid openings 406. The plates near the edge area of the absorbent contactor may not be removed to maintain integrity of the plate for handling purposes and for maintaining relative positions of the gas opening patterns.

In certain embodiments, another type of plate may be utilized with the plates noted above to provide fluid flow for the utility fluid. This third type of plate may be similar to the plates 404 with utility fluid openings 406, but areas near the edge area may be removed to provide direct access into the utility fluid opening. As an example, following assembly (with very high tolerance) and diffusion-bonding of the thin plates into a module, a portion of the plates may be milled to reveal the utility fluid opening. Following the diffusion-bonding step to form a module, a thin layer of high-temperature solder may be provided on the surfaces forming the utility fluid channels.

Figure 4B:
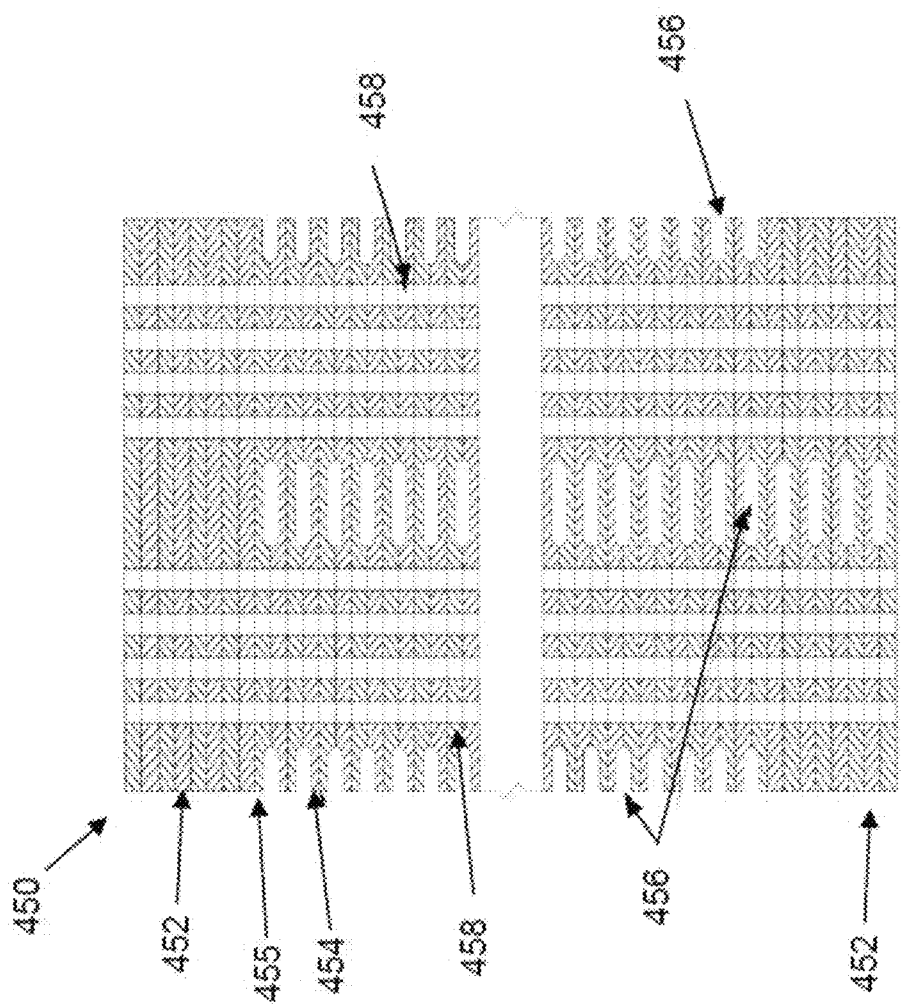

As an alternative embodiment, FIG. 4B hereof is a partial cross sectional view of a section 450 of a bundle of stacked adsorbent contactor in accordance with another exemplary embodiment of the present techniques. As shown in this figure, three types of thin plates may be utilized, which are (i) plates 452 without utility fluid openings; (ii) plates 454 with utility fluid openings 456 in a first portion of the plate; and (iii) plates 455 with utility fluid openings 456 in a second portion of the plate. Each of the plates 452, 454 and 455 include gaseous openings 458 to provide a fluid passage through the stacked adsorbent contactor. For the first type of plates 452, no material is removed in the area of the utility fluid openings 456, while the second and third types of plates 454 and 455 have a portion of the material removed to form the utility fluid openings 456. Similar to the discussion above, the plates near the edge area of the absorbent contactor may not have utility fluid openings 456 to maintain integrity of the plate for handling purposes and for maintaining relative positions of the gas opening patterns.

As shown in this figure, the utility fluid openings 456 that form the utility fluid channels are made of grooves or openings that may be machined or etched on the plate surface. These grooves are made in halves, which differ for the different plates 454 and 455 (e.g., one half on one plate and the other on the adjacent plate). By matching the two openings from the plates 454 and 455, a larger flow area is provided, which may be useful for thinner plates. For thicker plates, a single groove thickness may suffice for the utility fluid channel. As an example, if the plate is about 0.4 mm thick, the utility fluid opening has thickness may be as small as 2 plates×0.4 mm thickness×0.5 (fraction of plate thickness for channel)=0.4 mm, which is generally too thin; for a utility fluid such as water. Accordingly, the utility fluid opening should have a thickness of 1 mm or larger to avoid excessive pressure drop. That is, for thinner plates, the utility fluid opening may be limited by the available design pressure drop.

The stacking of the plates may also involve different aspects to further enhance the process. For example, in one or more embodiments, two or more plates or modules may be diffusion-bonded to provide a greater thickness for the final absorbent contactor and to seal the plates together in an effective manner. The thickness of this plate or module may be determined by the wash-coating-depth limitations or other processing steps. For thicker modules or plates, equipment interconnectivity may benefit from a deeper wash-coating ability. A thicker module (e.g., 150 mm or 6 in.) may provide easier attachment of the utility fluid (e.g., water) manifolds described below.

As another aspect, the plates or modules may be formed in a manner that a gasket may be utilized to seal the flow of fluids through the appropriate channels. Accordingly, one or more plates, such as the top and bottom plates or certain plates, may also include a recessed gasket seating areas. The recessed gasket seating areas may be formed through high-precision milling processes, such that the plates or modules may be assembled into a leak-tight heat exchanger unit.

Figure 2:
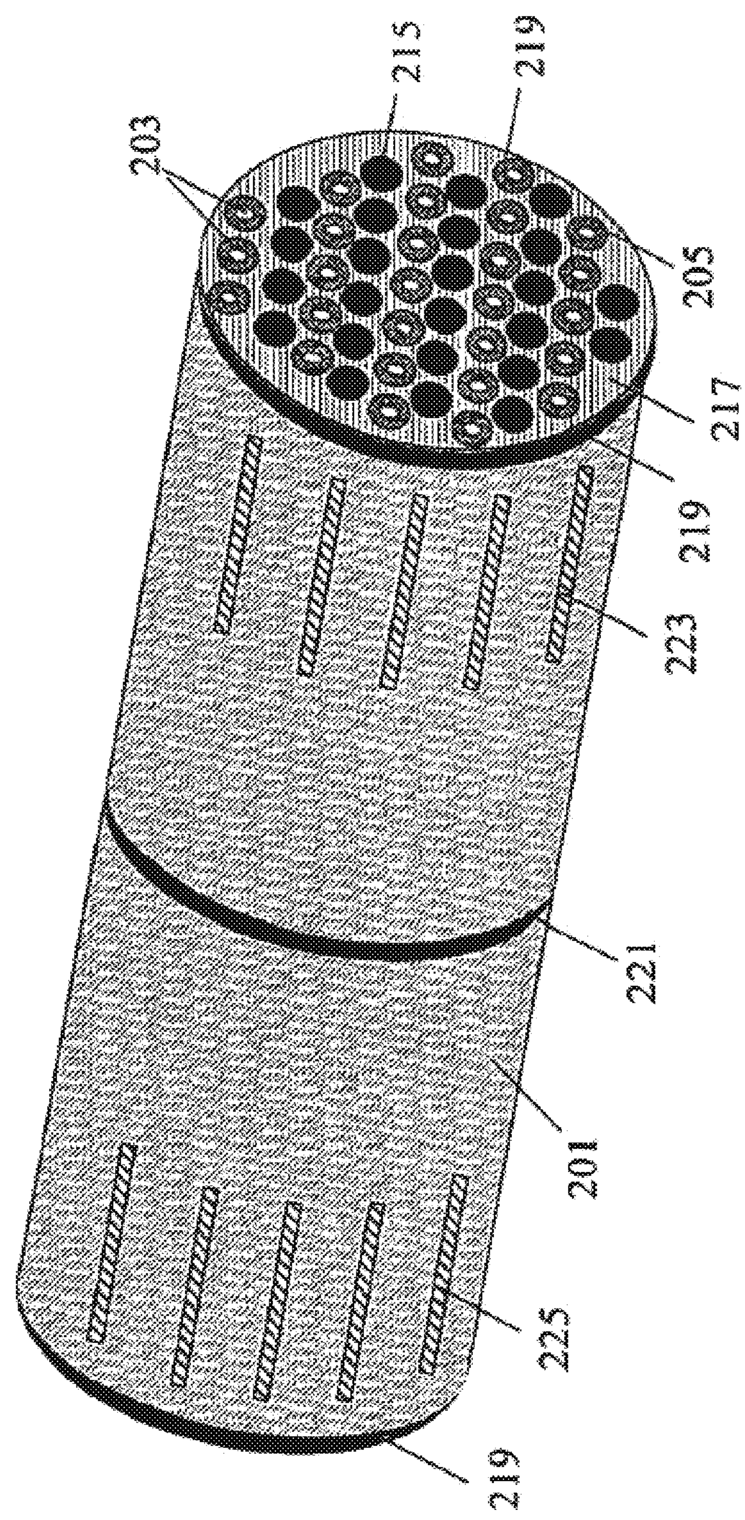
FIG. 2 schematically shows an example of an adsorbent structure.

FIG. 2 schematically shows another example of a parallel channel contactor in the form of a coated monolith 201 for TSA applications where the adsorbent layer is coated onto the channel of a preformed monolith comprised of non-adsorbent material. When TSA or RCTSA processes are performed the contactor will preferably have paths, or separate channels, that can be used to heat and cool the adsorbent. Additionally or alternately, a utility fluid or heat transfer fluid can be passed through the parallel channels. For TSA or RCTSA processes, the parallel channel contactor can be configured in a configuration similar to a shell and tube heat exchanger with the adsorbent coated on the tube walls of the heat exchanger. In this Figure, an extrusion process is used to form a monolith from a suitable non-adsorbent material including a metal such as steel, or a ceramic such as cordierite, or a carbon. A ceramic or metallic glaze or sol gel coating 219 is applied to seal the channel walls of the monolith. As previously mentioned, such glazes can be applied by slurry coating the channel walls followed by curing by firing. A sol gel can also be applied to the channel walls and then fired under conditions that densify the coating. As previously mentioned, it is also possible to use vacuum and pressure impregnation techniques to apply the glaze or sol gel. In this case the glaze or sol gel will penetrate into the pore structure of the monolith 217. In all cases the glaze seals the wall of the channel such that gas flowing through the channel is not readily transmitted into the body of the monolith. It may also be desirable to impregnate the pore structure of the monolith 217 with a solid material before the channel walls are sealed. Alternate rows of channels are sealed at their ends 215 in order to provide for TSA operation. At the opposite end of the monolith these same rows of channels are also sealed. Slots (223 and 225) are cut through the monolith at both ends to provide flow access to the sealed rows of channels 215. Sealing surfaces 219 are provided at both ends of the monolith as well as in the middle of the monolith 221. In operation, the monolith will be mounted in a module in a manner that seals the ends of the channels as well as the middle of the monolith. Any suitable technology can be used to seal the ends of the channels including metallic welds, gasketing with materials such as rubbers or carbons, and the use of adhesives such as inorganic cements and epoxies. The module is configured so that a heating or cooling fluid can be flowed through the channels sealed at the ends 215 by introducing it through the slots 223 and removing it through slots 225. The heating and cooling fluid will undergo heat exchange with fluid flowing through the channels that are open at the end of the module. These modifications to the monolith convert it into a heat exchanger. It will be understood that there are various other ways in which heat exchangers can be produced or configured. Non-limiting examples of such other ways include shell and tube heat exchangers, fiber film heat exchangers and printed circuit heat exchangers, all of which are well known in the art. By coating an adsorbent layer with a low volume fraction of mesopores and macropores on one side of a heat exchanger it can be used in accordance with the present invention. As such, this example illustrates how heat exchangers can be converted into modules suitable for TSA with an adsorbent layer having a low volume fraction of mesopores and macropores.

Feed channels 203 can have channel gaps from about 5 to about 1,000 microns, preferably from about 50 to about 250 microns. When the channel gap 203 is in a range from 50 to about 250 microns it is preferred that the thickness of the adsorbent layer 205 be in a range from about 25 to about 2,500 microns. For a 50 micron diameter feed channel 203 the preferred range of thickness for the adsorbent layer is from 25 to 300 microns and a more preferred range is from 50 to 250 microns. The adsorbent can be coated on the monolith by any convenient method.

Example of Incorporation of Perturbations into Swing Adsorption Cycle

Figure 5:
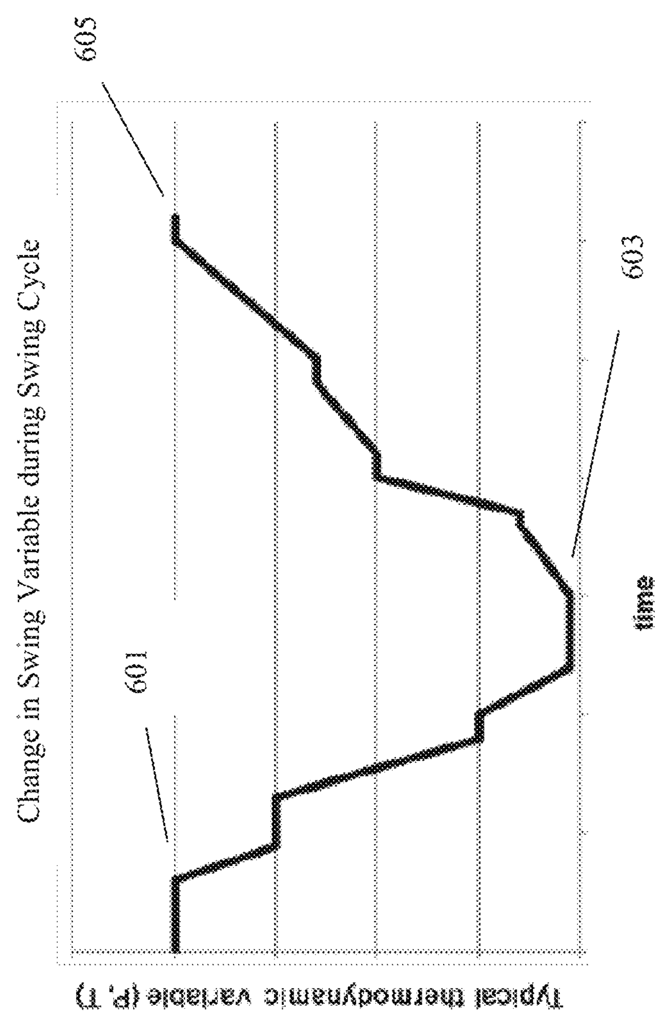
FIG. 5 schematically shows an example of a swing variable during a swing adsorption cycle.

FIG. 5 schematically shows an example of the change in a "swing" variable during a swing adsorption cycle. The swing variable in FIG. 5 can correspond to temperature, pressure, a combination thereof, or another variable that can be varied to allow an adsorbent contactor to shift from an adsorption mode to a desorption mode. For the swing variable shown in FIG. 5, the plot starts at a high value 601, which roughly corresponds to the end of an adsorption cycle. This can represent a high pressure, a low temperature, or some other convenient combination of pressure and temperature that facilitates adsorption. The plot in FIG. 5 then decreases, which represents change in the swing variable to start to facilitate desorption. This can include decreasing pressure, increasing temperature, or a combination thereof. It is noted that the decrease in swing variable could correspond to a modest increase in pressure if a sufficiently large temperature change is occurring. Similarly, the decrease in swing variable could correspond to a modest decrease in temperature if a sufficiently large pressure change is occurring. The decrease in the swing variable continues until a minimum level 603 is achieved. After a period of time at the minimum level 603, the swing variable can increase again until high value 605 is achieved, corresponding to the next adsorption step. It is noted that the change in swing variable can include various plateaus at intermediate levels to allow for additional time to facilitate adsorption and/or desorption of components from the adsorbent.

Figure 6:
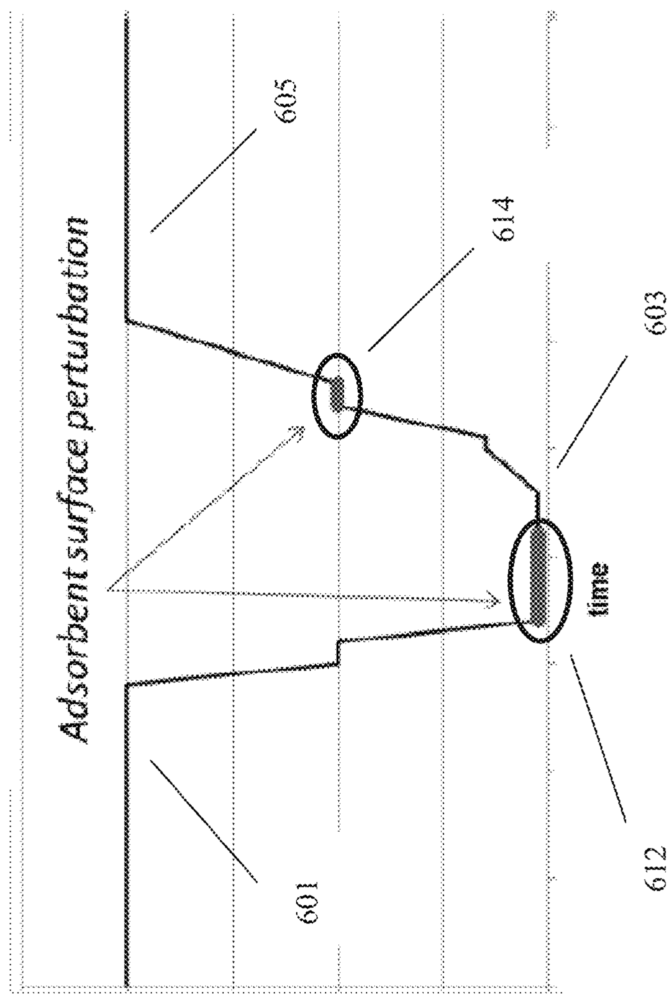
FIG. 6 schematically shows an example of a swing variable with induced perturbations during a swing adsorption cycle.

FIG. 6 schematically shows the changes in a swing variable for another swing cycle that includes perturbations at two different times in the cycle. In FIG. 6, two different time periods within the cycle are identified by circles 612 and 614. During these circled time periods, a perturbation is induced in the adsorbent structure, such as a vibration. Circle 612 corresponds to a perturbation occurring during the strongest desorption condition (i.e., minimum value 603 for the swing variable). In FIG. 6, the perturbation corresponding to circle 612 lasts for less than the amount of time that the swing variable is at the minimum value 603. In other examples, a perturbation could last for the amount of time that the adsorbent structure is exposed to the strongest desorption conditions (i.e., minimum for swing variable), or a for a period of time that includes the strongest desorption condition, or the one or more perturbations may be used at times different from the strongest desorption condition. Circle 614 corresponds to a second perturbation that occurs as the swing variable is increasing back to the adsorption value. This can represent, for example, a perturbation to assist with removal of a utility fluid from pores of an adsorbent structure. In the example shown in FIG. 6, the swing variable can correspond to temperature, and a utility fluid can be used to assist with at least a portion of the decrease in temperature back to the adsorption temperature. Prior to reaching the adsorption temperature, the flow of the utility fluid can be stopped, and a perturbation (corresponding to circle 614) can be induced to assist with removal of additional utility fluid from the adsorbent structure.

Additional Embodiments

Additionally or alternately, the present invention can include one or more of the following embodiments.

Embodiment 1

A method for performing a swing adsorption process, comprising: exposing an input fluid comprising a first gas component to an adsorbent structure comprising an adsorbent at a first temperature and a first pressure to adsorb at least a portion of the first gas component; desorbing at least a portion of the adsorbed first gas component under desorption conditions, the desorption conditions comprising at least one of a desorption temperature higher than the first temperature and a desorption pressure lower than the first pressure; and inducing, after the exposing, one or more perturbations in the adsorbent, the adsorbent structure, or a combination thereof, the one or more perturbation being induced prior to a subsequent exposing of input fluid to the adsorbent structure.

Embodiment 2

The method of Embodiment 1, the method further comprising exposing a utility fluid to the adsorbent, the adsorbent structure, or a combination thereof.

Embodiment 3

The method of Embodiment 2, wherein the utility fluid is exposed to the adsorbent during the exposing the input fluid to the adsorbent, during the desorbing, or a combination thereof.

Embodiment 4

The method of Embodiment 2 or 3, wherein the adsorbent structure comprises separate channels for the utility fluid.

Embodiment 5

The method of any of the above embodiments, wherein at least one perturbation is induced during the desorbing, at least one perturbation is induced during the exposing the utility fluid to the adsorbent, or a combination thereof.

Embodiment 6

The method of any of the above embodiments, wherein the adsorbent structure comprises a surface, at least a portion of the adsorbent being coated on the surface of the adsorbent structure.

Embodiment 7

The method of any of the above embodiments, wherein at least one perturbation comprises a vibration induced as a mechanical vibration, an electromechanical vibration, an acoustic vibration, or a combination thereof, preferably a mechanical vibration.

Embodiment 8

The method of any of the above embodiments, wherein at least one perturbation comprises an electromagnetic perturbation, a magnetic perturbation, a thermoacoustic perturbation, or a combination thereof.

Embodiment 9

The method of any of the above embodiments, wherein a plurality of the one or more induced perturbations have an overlap in time period.

Embodiment 10

The method of Embodiment 9, wherein a first time period for a first perturbation is contained within a second time period for a second perturbation.

Embodiment 11

The method of any of the above embodiments, wherein the swing adsorption process comprises a temperature swing adsorption process.

Embodiment 12

The method of any of the above embodiments, wherein the adsorbent structure comprises a plurality of plates, a plurality of modules, or a combination thereof.

Embodiment 13

The method of any of the above embodiments, wherein the adsorbent structure comprises a flexible structure, a curtain-like structure, a fabric-like structure, or a combination thereof.

Embodiment 14

The method of any of the above embodiments, wherein at least one induced perturbation varies during the inducing.

Embodiment 15

The method of Embodiment 14, wherein the variation in the at least one induced perturbation comprises a variation in a perturbation frequency, a variation in a perturbation amplitude, a variation in a perturbation type, or a combination thereof.

Embodiment 16

The method of any of the above embodiments, wherein the induced perturbation results in a perturbation-induced temperature increase in the adsorbent structure of about 10° C. or less, or about 5° C. or less.

Embodiment 17

A system for inducing perturbations in an adsorbent structure, comprising: an adsorbent structure comprising an adsorbent; a perturbation source for inducing a perturbation in the adsorbent, at least a portion of the adsorbent structure, or a combination thereof, the perturbation source comprising at least one of an actuator, an electromagnetic radiation source, an acoustic source, a thermoacoustic source, a magnet, and an electromagnet; and a controller for activating the perturbation source.

Embodiment 18

The system of Embodiment 17, further comprising a sensor for detecting a perturbation in the adsorbent, at least a portion of the adsorbent structure, or a combination thereof, the sensor being in communication with the controller to adjust the induced perturbation based on the detected perturbation.

Embodiment 19

The system of Embodiment 17 or 18, further comprising a vessel containing the adsorbent structure, the vessel further comprising at least one fluid inlet and at least one fluid outlet.

Embodiment 20

The system of any of Embodiments 17 to 19, wherein the system comprises a plurality of perturbation sources, at least one perturbation source comprising an actuator, an acoustic source, or a combination thereof.

Embodiment 21

The system of any of Embodiments 17 to 20, wherein the system performs the method of any of Embodiments 1 to 16.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for performing a swing adsorption process, comprising:

exposing an input fluid comprising a first gas component to an adsorbent structure comprising an adsorbent at a first temperature and a first pressure to adsorb at least a portion of the first gas component;

desorbing at least a portion of the adsorbed first gas component under desorption conditions, the desorption conditions comprising at least one of a desorption temperature higher than the first temperature and a desorption pressure lower than the first pressure; and inducing, after the exposing, a plurality of perturbations in the adsorbent, in the adsorbent structure, or a combination thereof, the a plurality of perturbations being induced prior to a subsequent exposing of input fluid to the adsorbent structure; wherein the plurality of the induced perturbations have an overlap in time period.

2. The method of claim 1, further comprising exposing a utility fluid to the adsorbent of the adsorbent structure.

3. The method of claim 2, wherein the utility fluid is exposed to the adsorbent during the exposing the input fluid to the adsorbent, during the desorbing, or a combination thereof.

4. The method of claim 2, wherein the adsorbent structure comprises separate channels for the utility fluid.

5. The method of claim 1, wherein the perturbation are induced during the desorbing, during the exposing the utility fluid to the adsorbent, or a combination thereof.

6. The method of claim 1, wherein the adsorbent structure comprises a surface, at least a portion of the adsorbent being coated on the surface of the adsorbent structure.

7. The method of claim 1, wherein the plurality of perturbations comprise a vibration induced as a mechanical vibration, an electromechanical vibration, an acoustic vibration, or a combination thereof.

8. The method of claim 1, wherein the plurality of perturbations comprise an electromagnetic perturbation, a magnetic perturbation, a thermoacoustic perturbation, or a combination thereof.

9. The method of claim 1, wherein a first time period for a first perturbation is contained within a second time period for a second perturbation.

10. The method of claim 1, wherein the swing adsorption process comprises a temperature swing adsorption process.

11. The method of claim 1, wherein the adsorbent structure comprises a plurality of plates, a plurality of modules, or a combination thereof.

12. The method of claim 1, wherein the adsorbent structure comprises a flexible structure, a curtain-like structure, a fabric-like structure, or a combination thereof.

13. The method of claim 1, wherein at least one induced perturbation varies during the inducing.

14. The method of claim 13, wherein the variation in the at least one induced perturbation comprises a variation in a perturbation frequency, a variation in a perturbation amplitude, a variation in a perturbation type, or a combination thereof.

15. The method of claim 1, wherein the induced perturbations result in a perturbation-induced temperature increase in the adsorbent structure of about 5° C. or less.

16. A system for inducing perturbations in an adsorbent structure, comprising:

an adsorbent structure comprising an adsorbent;

a perturbation source for inducing a perturbation in the adsorbent, at least a portion of the adsorbent structure, or a combination thereof, the perturbation source comprising at least one of an actuator, an electromagnetic radiation source, an acoustic source, a thermoacoustic source, a magnet, and an electromagnet;

a controller for activating the perturbation source; and a sensor for detecting a perturbation in the adsorbent, at least a portion of the adsorbent structure, or a combination thereof, the sensor being in communication with the controller to adjust the induced perturbation based on the detected perturbation.

17. The system of claim 16, further comprising a vessel containing the adsorbent structure, the vessel further comprising at least one fluid inlet and at least one fluid outlet.

18. The system of claim 16, wherein the system comprises a plurality of perturbation sources, at least one perturbation source comprising an actuator, an acoustic source, or a combination thereof.

19. A method for performing a swing adsorption process, comprising:

exposing an input fluid comprising a first gas component to an adsorbent structure comprising an adsorbent at a first temperature and a first pressure to adsorb at least a portion of the first gas component;

desorbing at least a portion of the adsorbed first gas component under desorption conditions, the desorption conditions comprising at least one of a desorption temperature higher than the first temperature and a desorption pressure lower than the first pressure; and inducing, after the exposing, one or more perturbations in the adsorbent, in the adsorbent structure, or a combination thereof, the one or more perturbation being induced prior to a subsequent exposing of input fluid to the adsorbent structure; wherein at least one induced perturbation varies during the inducing.

20. The method of claim 19, further comprising exposing a utility fluid to the adsorbent of the adsorbent structure.

21. The method of claim 20, wherein the utility fluid is exposed to the adsorbent during the exposing the input fluid to the adsorbent, during the desorbing, or a combination thereof.

22. The method of claim 20, wherein the adsorbent structure comprises separate channels for the utility fluid.

23. The method of claim 19, wherein at least one perturbation is induced during the desorbing, during the exposing the utility fluid to the adsorbent, or a combination thereof.

24. The method of claim 19, wherein the adsorbent structure comprises a surface, at least a portion of the adsorbent being coated on the surface of the adsorbent structure.

25. The method of claim 19, wherein at least one perturbation comprises a vibration induced as a mechanical vibration, an electromechanical vibration, an acoustic vibration, or a combination thereof.

26. The method of claim 19, wherein at least one perturbation comprises an electromagnetic perturbation, a magnetic perturbation, a thermoacoustic perturbation, or a combination thereof.

27. The method of claim 19, wherein a plurality of the one or more induced perturbations have an overlap in time period.

28. The method of claim 27, wherein a first time period for a first perturbation is contained within a second time period for a second perturbation.

29. The method of claim 19, wherein the swing adsorption process comprises a temperature swing adsorption process.

30. The method of claim 19, wherein the adsorbent structure comprises a plurality of plates, a plurality of modules, or a combination thereof.

31. The method of claim 19, wherein the adsorbent structure comprises a flexible structure, a curtain-like structure, a fabric-like structure, or a combination thereof.

32. The method of claim 19, wherein the variation in the at least one induced perturbation comprises a variation in a perturbation frequency, a variation in a perturbation amplitude, a variation in a perturbation type, or a combination thereof.

33. The method of claim 19, wherein the induced perturbation results in a perturbation-induced temperature increase in the adsorbent structure of about 5° C. or less.

* * * * *